United States Patent [19]
Weber et al.

[11] Patent Number: 6,142,418
[45] Date of Patent: Nov. 7, 2000

[54] MULTI-PATH SECONDARY POWER SYSTEM FOR AN AIRCRAFT

[75] Inventors: Kent Weber, Seattle, Wash.; Keith E. Short, Rockford, Ill.

[73] Assignee: Hamilton Sundstrand Corporation, Rockford, Ill.

[21] Appl. No.: 09/076,222

[22] Filed: May 12, 1998

[51] Int. Cl.$^7$ .................................................. B64D 35/00
[52] U.S. Cl. .......................................... 244/58; 244/17.19
[58] Field of Search ........................... 244/58, 54, 17.19, 244/17.21, 17.13

[56] References Cited

U.S. PATENT DOCUMENTS

| | | | |
|---|---|---|---|
| 4,514,976 | 5/1985 | Christoff | 60/39.07 |
| 4,546,865 | 10/1985 | Hodgman et al. | 192/84 C |
| 4,747,269 | 5/1988 | David | 60/445 |
| 4,900,231 | 2/1990 | Kennedy | 417/16 |
| 4,912,921 | 4/1990 | Rice et al. | 60/39.04 |
| 4,915,200 | 4/1990 | Jacques et al. | 192/30 W |
| 4,979,362 | 12/1990 | Versure, Jr. | |
| 4,993,533 | 2/1991 | Brown | 192/114 R |
| 5,040,654 | 8/1991 | Trommer | 192/114 R |
| 5,265,825 | 11/1993 | Ebert et al. | 244/17.13 |

*Primary Examiner*—Robert P. Swiatek
*Attorney, Agent, or Firm*—Lawrence E. Crowe

[57] ABSTRACT

An improved single engine military aircraft is provided through the use of an improved secondary power system which incorporates an additional accessory drive, and utilizes improved multi-path system architecture together with optimal distribution of accessories to thereby enhance partial operational flexibility of the secondary power system in both normal and partial failure modes of operation. The additional accessory drive also provides an aircraft in which the engine can be removed with minimal disruption of the EMAD or AMAD and accessories mounted thereon to thereby enhance both initial manufacturability and repairability of the aircraft and secondary power system.

22 Claims, 3 Drawing Sheets

MULTI-PATH SECONDARY POWER SYSTEM FOR AN AIRCRAFT

FIELD OF THE INVENTION

This invention relates to secondary power systems, such as those used in single engine military aircraft, that require a high degree of redundancy to ensure reliable operation of the aircraft in a variety of operational modes both prior to and after full or partial failure of the secondary power system or the main propulsion engine.

BACKGROUND

Secondary power systems of the type used in single engine military aircraft present significant and unique challenges to designers. Such power systems are typically required to provide a highly reliable and virtually uninterrupted source of power to flight or mission critical accessories or subsystems on the aircraft despite exposure to extremes in temperature and altitude, and after sustaining battle related damage to a portion of the power system. Such systems must also be easy to repair and maintain in remote areas and under the time pressures incident with the all weather, day and night, character of modern warfare.

In the jargon of aircraft power systems, the term "Primary Power System" is generally meant to include only the primary propulsion engine, and the term "Secondary Power System" is sometimes used in a broad sense to include all power consuming accessories, gearboxes, accessory drives, and power sources on the aircraft other than the propulsion engine. The term "Secondary Power System" is used herein in a somewhat narrower context intended to include only those accessories, gearboxes, accessory drives, and secondary power sources receiving rotating shaft power from the propulsion engine, or delivering rotating shaft power to the propulsion engine.

Specifically, a typical secondary power system of the type contemplated by our invention includes one or more accessories requiring a rotational drive input, such as electrical generators, hydraulic pumps, or environmental control equipment providing air pressurization and conditioning. A Secondary Power System according to our invention may also include one or more secondary power sources, often known as Auxiliary Power Units (APU's) or Emergency Power Units (EPU's), that can be selectively coupled to drive a portion of the secondary power system, while the aircraft is on the ground with the propulsion engine not operating, or in flight after a failure of the propulsion engine or a portion of the drive system.

Virtually all aircraft secondary power systems include some form of engine gearbox (EGB) operably connected to receive rotating shaft power from the propulsion engine, and most are configured to provide multiple mechanical drive shafts for connection to the accessories. Engine gearboxes also typically include gear trains to convert engine RPM into the proper speed for the accessories driven by those drive shafts.

The secondary power system in multi-engine commercial aircraft has conventionally utilized an engine gearbox (EGB) on each engine, with each EGB including appropriate drive accommodations for all accessories mechanically connected to the engine by drive shafts. Typical accessories include an electrical generator, hydraulic pumps, an air turbine starter for the propulsion engine, and engine driven fuel pumps. For this type of installation, there is generally a common oil circuit provided for lubrication of the engine and all of the accessories mounted on the EGB. Other functions such as cabin pressurization and cooling, pneumatic power, and auxiliary or emergency power from an APU and a Ram Air Turbine (RAT) are typically coupled to the engine via pneumatic, hydraulic, or electrical lines and are thus outside the scope of the definition of secondary power system adopted herein because these devices are not directly mechanically driven by or connected to the EGB.

The guiding rationale for selecting a single EGB arrangement and the shared oil system in such aircraft may be that, because there are multiple propulsion engines each having a separate Secondary Power System, and because there is also available APU and or EPU equipment that can be coupled to the propulsion engine without use of the Secondary Power System in the narrower definition contemplated by this invention, there is sufficient redundancy on the aircraft so that if a given component in the Secondary Power System on one engine fails, that component or the secondary power system that it is a part of can be simply decoupled and shut down without adversely affecting overall aircraft operations or risking contamination of the shared oil circuit as a result of the failure of an accessory.

In single engine military planes, however, a different approach is generally taken. Here the engine typically includes an engine mounted gearbox which drives only those accessories dedicated to the engine itself, such as engine driven fuel pumps, a small generator providing electrical power for ignition and control of the engine itself, and a hydraulic pump to provide lubrication and cooling of the engine bearings. Other accessories are typically mounted on a separate gearbox connected to and driven by an output shaft of the EGB. In some instances this separate gearbox is mounted directly on the EGB and is known as an Engine Mounted Accessory Drive (EMAD). In other cases, the separate gearbox is mounted on the airframe and connected to the EGB shaft by a separate drive shaft that allows tolerance for dimensional differences and relative movement between the EGB and the separate gearbox. Where the separate gearbox is mounted on the airframe rather than the EGB, it is known as an Aircraft Mounted Accessory Drive (AMAD). In both an EMAD and AMAD based system, a separate lube oil system for the EGB lubrication system is typically provided for the EMAD or AMAD. It is also common in military aircraft to have the APU or EPU coupled mechanically directly to the EMAD or AMAD, if they are present.

The inclusion of either an AMAD or an EMAD in the secondary power system of a military aircraft to allow isolation of those accessories dedicated to the engine does not come without a price. Adding the AMAD or EMAD increases the complexity, cost, size and weight of the secondary power system, and because there are now more parts to potentially fail, also decreases reliability. These factors have driven the designers of prior Secondary Power Systems to provide only a single EMAD, or alternatively a single AMAD in addition to the EGB.

One major drawback of prior EMAD based systems is that because the EMAD is mounted on the EGB, it is typically necessary to remove the EMAD and all of its accessories with the engine, if engine replacement is required. Such a removal typically necessitates draining and disconnecting hydraulic lines extending from pumps mounted on the EMAD. This is a difficult and time consuming task.

The use of an AMAD rather than an EMAD theoretically alleviates some of the problems related above with regard to the difficulty of engine removal. In some installations however, there is not enough room adjacent the EGB, or there are other physical constraints that necessitate the use of an EMAD rather than an AMAD. Even if an AMAD is used rather than an EMAD, removal of the AMAD prior to removal of the engine might have still been required if the AMAD was mounted in a location hampering removal of the engine.

The overall approach taken with regard to designing secondary power systems for prior single engine military aircraft evinces a strong desire to keep the lube oil circuits for the engine and EMAD or AMAD separate to minimize the risk of contaminating the engine lubrication circuit or EGB in the event of a failure in one of the accessories. The prior approach with regard to acceptability of mounting the EMAD in a manner requiring its removal with the engine evinces a bias toward keeping the secondary power system as compact and tightly packaged about the engine as possible to minimize the overall size and radar signature of the aircraft, even if that meant making engine replacement more difficult. Also it may have been felt that the accessories were so much less reliable than the propulsion engine that they should be more readily removable than the engine, or that the additional parts required to allow removal of the engine without disturbing the EMAD imposed too great a liability in terms of increased complexity, cost, size or weight, and unacceptable reductions in the reliability of the Secondary Power System.

Although the prior approaches outlined above were acceptable in their day and were no doubt derived through assumptions that were valid at the time, further improvements are both possible and necessary for the next generation of single engine aircraft. For instance, although it may have been acceptable in the past to mount an AMAD or an EMAD in a manner that required removal of the AMAD or EMAD and its accessories to replace an engine, such an approach is not acceptable for the next generation of single engine military aircraft. Furthermore, with the passage of time the reliability of the accessories and secondary power sources included in the secondary power system have improved to the point that old biases are no longer valid. Continuing to use the old assumptions and biases imposes undesirable and unnecessary constrains on the design and operational flexibility of the next generation of secondary power systems and the aircraft carrying them.

In a new single engine military aircraft currently being designed, it is highly desirable during both initial assembly and subsequent repair operations to be able to remove and replace the main engine without removal of the EMAD or the AMAD, or any of the accessories mounted thereon. It is also highly desirable to not have to break any of the hydraulic or pneumatic lines, fuel lines, or electrical connections on any of the accessories mounted on the EMAD or AMAD, whichever the case may be, incident removal of the main engine.

With the faster paced, all weather, day or night, character of modern warfare, it is now more important than ever to be able to get a military aircraft back into service as quickly as possible, even after a major repair such as removal and replacement of a main engine. It is also highly desirable to take advantage of new higher reliability accessories and new system configurations to increase the flexibility of partial operation of the secondary power system after a partial failure of that system, and thereby enhance the overall operational capability of the aircraft.

It is an object of our invention, therefore, to provide an improved single engine aircraft. Further objects of our invention include providing:

1) an improved secondary power system for an aircraft;
2) a secondary power system with improved partial operational flexibility after a failure of an accessory or a primary or secondary power source; and
3) a secondary power system with improved maintainability.

SUMMARY

Our invention provides such an improved aircraft through the use of an improved secondary power system which incorporates an additional accessory drive, and utilizes improved multi-path system architecture together with optimal distribution of accessories to thereby enhance partial operational flexibility of the secondary power system in both normal and partial failure modes of operation. Our invention also provides an aircraft in which the engine can be removed with minimal disruption of the EMAD or AMAD and accessories mounted thereon to thereby enhance both initial manufacturability and repairability of the aircraft and secondary power system.

According to one aspect of our invention the improved aircraft includes a propulsion engine driving a secondary power system having an engine gearbox operably connected to be driven by the propulsion engine, and a first and a second accessory drive operably connected to be rotationally driven by the engine gearbox. The accessory drives can be two aircraft mounted AMAD's, two engine mounted EMAD's, or one EMAD and one AMAD, thereby offering considerable flexibility for optimizing the aircraft and secondary power system.

According to a second aspect of our invention, each of the accessory drives can be equipped with a secondary power source such as an APU or an EPU, and one or more clutches to provide a dual-mode drive source for the accessories mounted on the accessory drives, the first mode utilizing the propulsion engine as a power source, and the second mode being powered by the APU or the EPU attached to the accessory drive. In some embodiments of our invention, a torque converter drive is also included in the accessory drive connected to the APU so that the APU may be used to spin up the propulsion engine, or vice versa, to facilitate starting either the propulsion engine or the APU.

According to a third aspect of our invention, components of certain highly critical accessory systems such as hydraulic pumps may be redundantly duplicated and one of the redundant components operably connected to each accessory drive to provide a third path through the secondary power system for powering the accessory system.

Another aspect of our invention allows separate, dedicated, lubrication pumps and circuits to be provided, if desired, for the engine gearbox and each of the accessory drives to thereby enhance damage tolerance of the system by preventing debris or contamination in any one of the lubrication circuits from being transported by the lubrication fluid to another accessory drive or the engine gearbox.

According to another aspect of our invention, the accessory drives are operably connected to the engine gearbox solely via a rotating shaft that may be removed to allow the propulsion engine and engine gearbox to be removed without removal of the accessory drive, or breaking any hydraulic, electrical or pneumatic connections of accessories mounted on the accessory drive. This aspect provides significant advantages over prior aircraft and secondary power systems in which it is necessary to depressurize, drain, and disconnect fluid lines in accessory systems such as hydraulic or fuel systems prior to removing the propulsion engine or engine gearbox.

These and other aspects, advantages, and novel features of our invention will be readily apparent upon consideration of the following drawings and detailed description of preferred embodiments.

DETAILED DESCRIPTION

Figure 1:
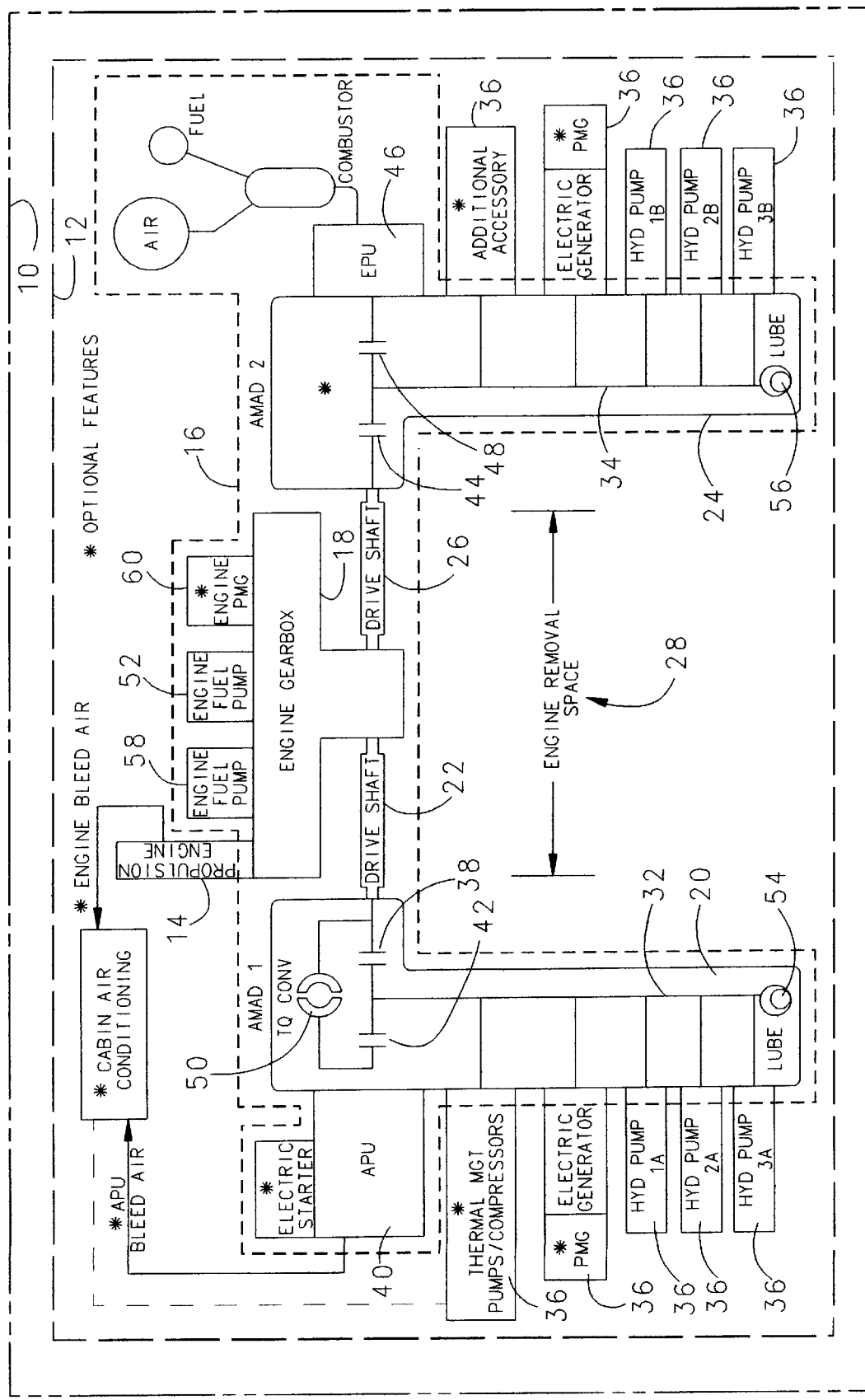
FIG. 1 depicts an aircraft and secondary power system according to our invention wherein the secondary power system includes an engine driven gearbox and two airframe mounted accessory drives.

FIG. 1 depicts an exemplary embodiment of our invention in the form of an aircraft 10 having an airframe 12. A propulsion engine 14 is mounted to the airframe 12 and operably connected to a secondary power system 16.

The secondary power system 16 includes an engine mounted gearbox (EGB) 18 mounted on and operably connected to the propulsion engine 14, and a first and second accessory drive in the form of a first and a second Airframe Mounted Accessory Drive (first and second AMAD) 20, 24 operably connected to the engine gearbox by a first and a second drive shaft 22,26 respectively.

As illustrated graphically in FIG. 1, the first and second AMAD's 20,24 on opposite sides of the EGB 18 and spaced sufficiently apart on the airframe 12 to provide an engine removal space 28 wide enough to allow the engine 14 and EGB 18 to pass between the first or second AMAD 20,24. FIG. 1 further illustrates that because the first and second AMAD's 20,24 are operably connected to the EGB 18 solely by the first and second drive shafts 22,26 that can be removed without disturbing the mounting of the AMAD's 20,24, the engine 12 and EGB 18 can be removed from the airframe 12 without removing either the first or second AMAD 20,24 and without disconnecting any hydraulic, electrical, or pneumatic lines connected to accessories or secondary power sources mounted on the AMAD's 20,24.

Those having skill in the art will recognize that the ability to remove the engine 14 and the EGB 18 without disturbing either AMAD 20,24 or disconnecting any lines provides significant advantages in manufacturability and repairability compared to secondary power systems in prior single engine aircraft. Also, by mounting the AMAD's 20,24 in a widely spaced manner away from the EGB 18 battle damage tolerance is enhanced because it is harder for a single munition strike to simultaneously disable both AMAD's 20,24 and the EGB 18.

The first and second AMAD's 20,24 further include first and second drive means 32,34 respectively for driving accessories 36 operably attached to the first and second AMAD's 20,24. These drive means 32,34 would generally take the form of a geartrain capable of providing an appropriate rotational speed for each of the various accessories 36.

The first drive means 32 of the first accessory drive 20 includes a first AMAD clutch 38 operably connected to allow selective connection or disconnection of the first drive means 32 from the EGB 18. The first accessory drive 20 in FIG. 1 further includes a secondary power source in the form of an Auxiliary Power Unit (APU) 40 operably connectable by an APU clutch 42 to the first drive means 32. The APU depicted is of typical construction including an air-breathing gas turbine engine providing rotating shaft power for driving the first AMAD, and also providing APU Bleed Air for use by pneumatic equipment such as a cabin pressurizing and Environmental Conditioning System (ECS). With the first AMAD clutch 38 engaged and the APU clutch 42 disengaged, the first AMAD 20 will be driven by the EGB 18. By disengaging the first AMAD clutch 38 and engaging the APU clutch 42 the first AMAD 20 can be driven by the APU 40 to thereby provide a dual source of power for driving the accessories 36 connected to the first AMAD 20.

In similar fashion, the second drive means 34 of the second accessory drive 24 includes a second AMAD clutch 44 operably connected to allow selective connection or disconnection of the second drive means 34 from the EGB 18. The second accessory drive 24 in FIG. 1 further includes a secondary power source in the form of an Emergency Power Unit (EPU) 46 operably connectable by an EPU clutch 48 to the second drive means 34. The EPU 46 depicted is of typical construction including a turbine driven by hot gas produced in a combuster supplied with stored, pressurized, air and fuel to produce rotating shaft power for driving the second AMAD 24. With the second AMAD clutch 44 engaged and the EPU clutch 48 disengaged, the second AMAD 24 will be driven by the EGB 18. By disengaging the second AMAD clutch 44 and engaging the EPU clutch 48 the second AMAD 22 can be driven by the EPU 46 to thereby provide a dual source of power for driving the accessories 36 connected to the second AMAD 24.

The first AMAD 20 of the embodiment of FIG. 1 also includes a torque converter 50 that may be drained or filled selectively to provide a fluid coupling between the APU 40 and the propulsion engine 14, thereby allowing the APU 40 to drive the engine 14 during ground or in-flight engine starting in a manner well known to those having skill in the art. Conversely, the torque converter 50 can also be filled while the engine 14 is running or spooling down, to thereby spin up and facilitate starting of the engine in the APU 40.

The embodiment depicted in FIG. 1 also includes separate lubrication pumps 52,54,56 respectively dedicated to serving the EGB 18, the first AMAD 20, and the second AMAD 24. By providing separate lube pumps 52,54,56 damage tolerance of secondary power system 16 is maximized because the EGB 18 and the first and second AMAD's 20,24 can be operated after one of them is damaged or sustains a failure without fear of contamination being spread to the other AMAD or EGB by a shared lubrication circuit. Furthermore, because the EGB 18, the first AMAD 20, and the second AMAD 24 are each connectable to an independent power source in the form of the propulsion engine 14, the APU 40, and the EPU 46 respectively, the inclusion of independent dedicated lubrication pumps 52, 54, 56 allows the EGB 18 and the first and second AMAD's 20,24 to be run totally independently of one another, thereby providing greater flexibility than was possible with prior aircraft in operating the secondary power system 16 under normal conditions, and following a partial failure of the secondary power system 16 or loss of power from the main engine 14.

Those skilled in the art will no doubt have already deduced that a fundamental premise in designing our system was to provide at least two paths through the secondary power system 16 for driving each of the accessories operably connected to the first and second AMAD's 20,24. As will be evident from FIG. 1 and the explanation above, the accessories 36 mounted on the first AMAD 20 may be driven alternatively by either the propulsion engine 14 or by the APU 40. In similar fashion, the accessories 36 mounted on the second AMAD 24 may be driven alternatively by either the propulsion engine 14 or by the EPU 46.

To further enhance damage tolerance and partial performance capability of the secondary power system 16, our invention contemplates judiciously selecting the accessories mounted on the first and second AMAD 20,24 and the EGB 18 in such a manner that those accessories critical to operation of the engine such as the engine lube pump 52, an engine fuel pump 58, and a small electrical generator 60 dedicated to providing power for engine control are mounted on the EGB.

To yet further enhance damage tolerance and post failure partial operation of the secondary power system 16, it may be desirable to add component redundancy in certain highly critical accessory systems 36, and judiciously split the mounting of the redundant components between the first and second AMAD's 20,24 so that even after the loss of one of the AMAD's 20,24 the critical accessory system can still be powered by the remaining AMAD.

For example, multiple hydraulic systems can be provided to limit the extent that loss of any one system will have on aircraft performance. In the embodiment of our invention depicted in FIG. 1, three hydraulic systems are illustrated by hydraulic pumps numbered 1 through 3. Each of the three hydraulic systems includes a first and a second pump connected in parallel to supply fluid to its respective hydraulic system. Looking specifically at the first hydraulic system, the first pump, designated as pump 1A in FIG. 1, is mounted on and driven by the first AMAD 20, and the second pump for the first hydraulic circuit, designated as pump 1B, is mounted on and driven by the second AMAD 24. The pumps for the second and third hydraulic circuits are similarly designated and mounted with the first pump of each circuit bearing an "A" designation and being driven by the first AMAD 20, and the second pump of each circuit bearing the "B" designation and being driven by the second AMAD 24. This arrangement allows each of the three critical hydraulic systems to continue to operate following the loss either AMAD 20,24, thereby providing significant additional operational flexibility under normal or post failure operation by providing a third drive path through the secondary power system 16 and driving the second pump (i.e. the one designated nB) for supplying fluid to the hydraulic system including pump nB.

Figure 2:
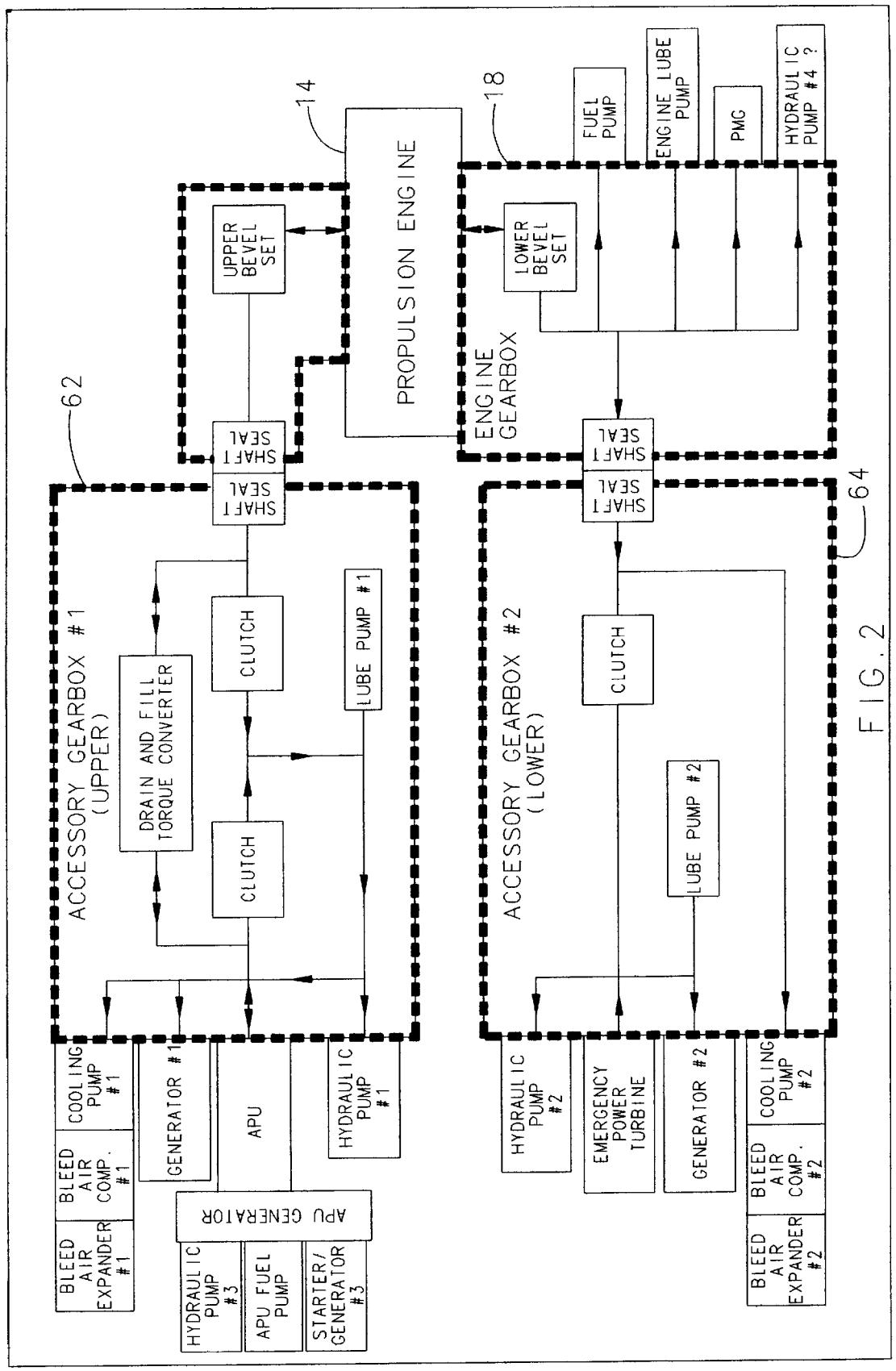
FIG. 2 depicts an aircraft and secondary power system according to our invention wherein the secondary power system includes an engine driven gearbox, one airframe mounted accessory drive, and one engine mounted accessory drive.
Figure 3:
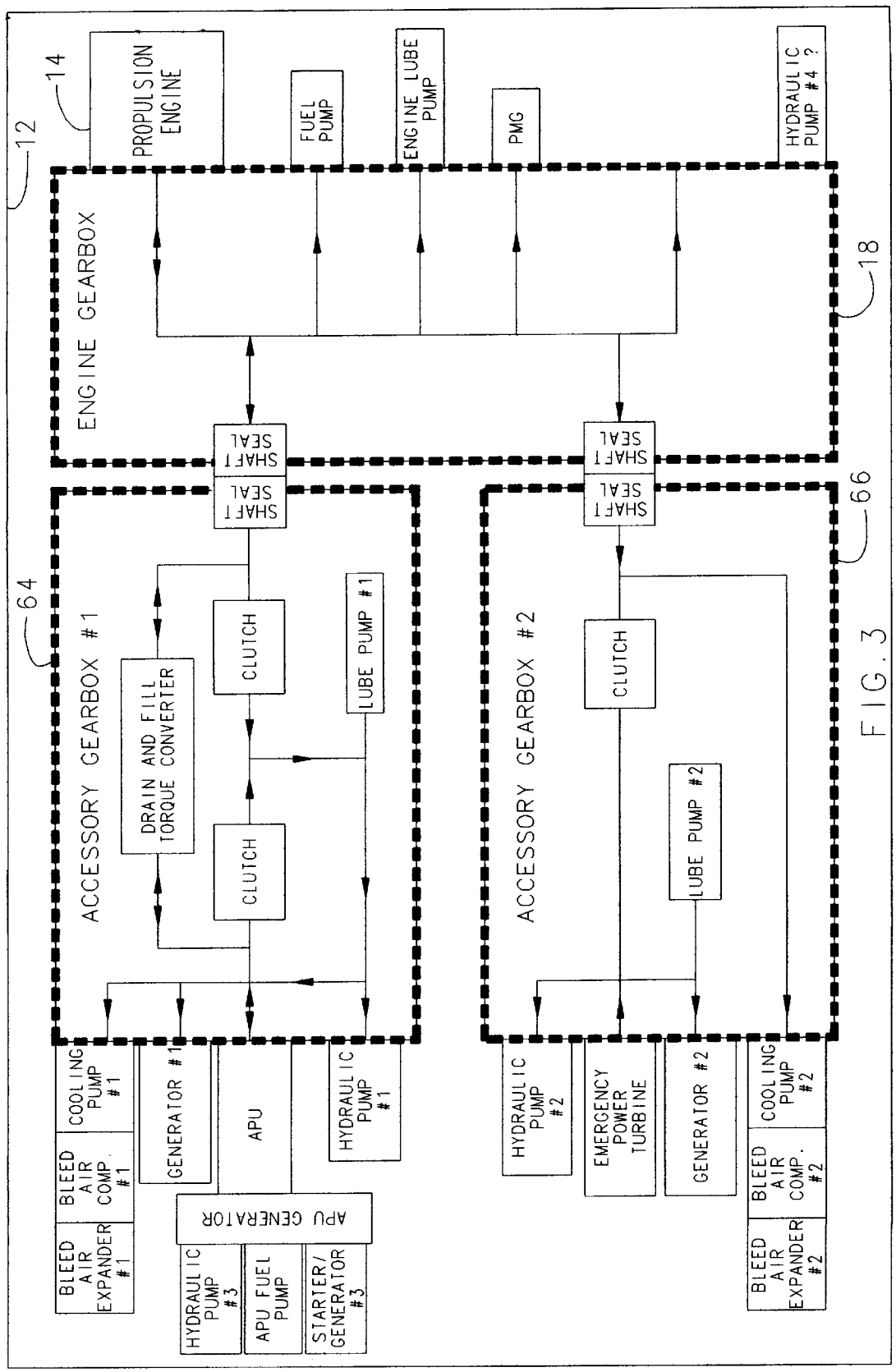
FIG. 3 depicts an aircraft and secondary power system according to our invention wherein the secondary power system includes an engine driven gearbox and two engine mounted accessory drives.

From the foregoing description, those skilled in the art will readily recognize that aircraft and secondary power systems according to our invention provide significant advances over prior aircraft and secondary power systems. Those skilled in the art will further recognize that although we have described the invention herein with respect to certain specific embodiments and applications thereof, many other embodiments and applications are possible within the scope of our invention as described in the appended claims. For example, although the exemplary embodiment illustrated in FIG. 1 utilized two AMAD's 20,24, in other embodiments of our invention, as shown in FIG. 2, it may be desirable to utilize a secondary power system including one AMAD 62 and one Engine Mounted Accessory Drive (EMAD) 64 mounted on the EGB 18. As shown in FIG. 3, in yet other embodiments it may be desirable to eliminate the AMAD entirely and use a first and a second EMAD 64,66 mounted on the EGB 18. It will also be understood that many other accessory groupings are possible and desirable in practicing our invention, thereby allowing designers of aircraft and secondary power systems great flexibility in optimizing a multi-mode system according to our invention.

It is understood, therefore, that the spirit and scope of the appended claims should not be limited to the specific embodiments described and depicted herein.

We claim:

1. An aircraft having a propulsion engine driving a secondary power system comprising:
    a) an engine gearbox operably connected to the propulsion engine; and
    b) a first and a second accessory drive operably connected to said engine gearbox to be rotationally driven thereby, with said at least one of said first and second accessory drives having drive means for driving aircraft accessories.

2. The aircraft of claim 1 wherein said engine gearbox includes engine gearbox lubrication means for said propulsion engine and engine gearbox.

3. The aircraft of claim 2 wherein said first accessory drive includes first accessory drive lubrication means separate from said engine gearbox lubrication means for providing lubrication to said first accessory drive.

4. The aircraft of claim 2 wherein said second accessory drive includes second accessory drive lubrication means separate from said engine gearbox lubrication means for providing lubrication to said second accessory drive.

5. The aircraft of claim 1 wherein said first accessory drive includes first accessory drive lubrication means.

6. The aircraft of claim 1 wherein said second accessory drive includes second accessory drive lubrication means.

7. The aircraft of claim 1, wherein:
    a) said engine gearbox includes engine gearbox lubrication means for said propulsion engine and engine gearbox;
    b) said first accessory drive includes first accessory drive lubrication means separate from said engine gearbox lubrication means for providing lubrication to said first accessory drive; and
    c) said second accessory drive includes lubrication means separate from said engine gearbox lubrication means for providing lubrication to said second accessory drive.

8. The aircraft of claim 1, wherein at least one of said first and second accessory drives are operably connected to said engine gearbox only via a rotating shaft.

9. The aircraft of claim 1, wherein the propulsion engine and engine gearbox are removable from the aircraft without removal of at least one of said first and second accessory drives.

10. The aircraft of claim 1, wherein the propulsion engine and engine gearbox are removable from the aircraft without removal of either said first and second accessory drives.

11. The aircraft of claim 1, wherein said secondary power system includes a first source of secondary power operably connected to rotatably drive said first accessory drive.

12. The aircraft of claim 11 wherein said secondary power system includes a second source of secondary power operably connected to rotatably drive said second accessory drive.

13. The aircraft of claim 1 wherein at least one of said first or second accessory drives includes means driven by said engine gearbox for driving an accessory operably attached to said at least one of said first or second accessory drives.

14. The aircraft of claim 13 wherein said means for driving includes a clutch operably connected to selectively connect or disconnect said means for driving from said engine gearbox.

15. The aircraft of claim 14 wherein said first accessory drive further includes a secondary power source operably connected to said means for driving for driving said means for driving.

16. The aircraft of claim 15 wherein said means for driving further includes a clutch operably connected for selective engagement and disengagement of said secondary power source from said means for driving.

17. The aircraft of claim 1 wherein at least one of said first and second accessory drives further includes a source of auxiliary power and a torque converter for operably connecting said source of auxiliary power to said engine gearbox for starting said propulsion engine.

18. The aircraft of claim 1 wherein at least one of said first and second accessory drives further includes a source of auxiliary power and a torque converter for operably connecting said source of auxiliary power to said engine gearbox for starting said source of auxiliary power.

19. The aircraft of claim 1 further including a hydraulic circuit having a first and a second pump connected in parallel, with said first pump being operably connected to said first accessory drive to be driven thereby, and said second pump being operably connected to said second accessory drive to be driven thereby.

20. The aircraft of claim 1 wherein at least one of said accessory drives is an EMAD, mounted to the engine gearbox.

21. The aircraft of claim 1 further including an airframe; and wherein at least one of said accessory drives is mounted on said airframe.

22. An aircraft having a propulsion engine driving a secondary power system comprising:

a) an engine gearbox operably connected to the propulsion engine; and b) a first and a second accessory drive operably connected to said engine gearbox to be rotationally driven thereby, with said at least one of said first and second accessory drives having drive means for driving aircraft accessories;

said first accessory drive including first accessory drive lubrication means separate from said engine gearbox lubrication means for providing lubrication to said first accessory drive, and said second accessory drive including lubrication means separate from said engine gearbox lubrication means for providing lubrication to said second accessory drive.

* * * * *